(12) United States Patent
Roberts et al.

(10) Patent No.: US 8,733,380 B1
(45) Date of Patent: May 27, 2014

(54) GARAGED VEHICLE COVER

(76) Inventors: Thomas W. Roberts, Sarasota, FL (US); Frank Brunckhorst, Sarasota, FL (US)

( * ) Notice: Subject to any disclaimer, the term of this patent is extended or adjusted under 35 U.S.C. 154(b) by 447 days.

(21) Appl. No.: 12/963,682

(22) Filed: Dec. 9, 2010

(51) Int. Cl.
   *E04H 15/04* (2006.01)

(52) U.S. Cl.
   USPC ............ 135/90; 135/96; 135/159; 135/120.4; 52/83; 296/136.1; 254/334

(58) Field of Classification Search
   USPC ............ 135/90, 96, 156, 159–160, 119, 117, 135/120.4, 121, 88.07; 52/63, 83, 222; 296/136.1, 136.01, 136.04, 136.11, 296/136.13; 254/394–365, 334, 338
   See application file for complete search history.

(56) References Cited

U.S. PATENT DOCUMENTS

| | | | | |
|---|---|---|---|---|
| 969,899 | A * | 9/1910 | Partington | ........................ 135/90 |
| 1,279,596 | A | 9/1918 | Sharbondy | |
| 1,285,766 | A | 11/1918 | Martin | |
| 1,759,628 | A | 5/1930 | Pellegrino | |
| 1,801,247 | A | 4/1931 | Rush | |
| 1,849,738 | A | 3/1932 | Amico | |
| 2,097,923 | A | 11/1937 | Hutchinson | |
| 2,679,254 | A | 5/1954 | Green | |
| 2,995,137 | A | 8/1961 | Cothern | |
| 3,482,585 | A * | 12/1969 | Overstreet | .................... 135/121 |
| 4,487,212 | A | 12/1984 | Moore | |
| 4,605,030 | A | 8/1986 | Johnson | |
| 4,655,236 | A | 4/1987 | Dorame et al. | |
| 4,817,654 | A * | 4/1989 | Christensen | .................... 135/90 |
| 4,830,427 | A | 5/1989 | Fiocchi | |
| 4,834,128 | A | 5/1989 | Burgess | |
| 4,991,612 | A | 2/1991 | Kiss et al. | |
| 5,044,132 | A | 9/1991 | Harman | |
| 5,241,977 | A | 9/1993 | Flores et al. | |
| 5,259,408 | A * | 11/1993 | Guerin | ............................ 135/90 |
| 5,263,687 | A * | 11/1993 | Garbiso | ........................ 254/334 |
| 5,269,332 | A | 12/1993 | Osborne | |
| 5,579,796 | A | 12/1996 | Mallo et al. | |
| 5,621,926 | A * | 4/1997 | La Madeleine | ................... 4/498 |
| 5,769,105 | A | 6/1998 | Margol et al. | |
| 5,839,237 | A * | 11/1998 | Davidson | ........................... 52/3 |
| 6,134,848 | A * | 10/2000 | Walter | ............................. 52/63 |
| 6,152,427 | A * | 11/2000 | Hoslett | ........................ 254/338 |
| 6,276,381 | B1 | 8/2001 | O'Brien | |
| 6,394,118 | B1 | 5/2002 | Cikanowick et al. | |
| 6,776,178 | B1 * | 8/2004 | Glynn et al. | .................. 135/115 |
| 6,916,043 | B2 | 7/2005 | Rhea et al. | |

(Continued)

FOREIGN PATENT DOCUMENTS

CH            689292 A5 *   2/1999  ............ A01K 15/02

*Primary Examiner* — Winnie Yip
(74) *Attorney, Agent, or Firm* — Charles J. Prescott, P.A.

(57) ABSTRACT

A garage car cover apparatus attachable to a ceiling of a garage including a flexible fabric car cover configured to drapingly cover a vehicle. A power unit attaches to the ceiling and to a lifting shaft having a plurality of spaced sheaves. Attaching points on the cover each connect to one end of a flexible line. A plurality of ceiling pulleys are each connectable to the ceiling directly above one of the attaching points when the cover is draped over the vehicle, each flexible line connected at one end to one sheave, a mid-portion of each line supported on one pulley. The cover is raised or lowered vertically from, and drapingly onto the vehicle by operation of the power unit. An alternate embodiment utilizes an existing power unit of an overhead garage door opener to facilitate automatic deployment and retraction.

10 Claims, 9 Drawing Sheets

(56) References Cited

U.S. PATENT DOCUMENTS

| 7,008,002 | B2 | 3/2006 | Rhea et al. |
| 7,194,976 | B1 | 3/2007 | Kramer |
| 7,467,784 | B2 | 12/2008 | Turner |
| 2003/0160142 | A1* | 8/2003 | Brahler et al. ............... 248/317 |
| 2005/0055886 | A1 | 3/2005 | Sharapov |
| 2006/0254158 | A1* | 11/2006 | Saller et al. ...................... 52/63 |

* cited by examiner

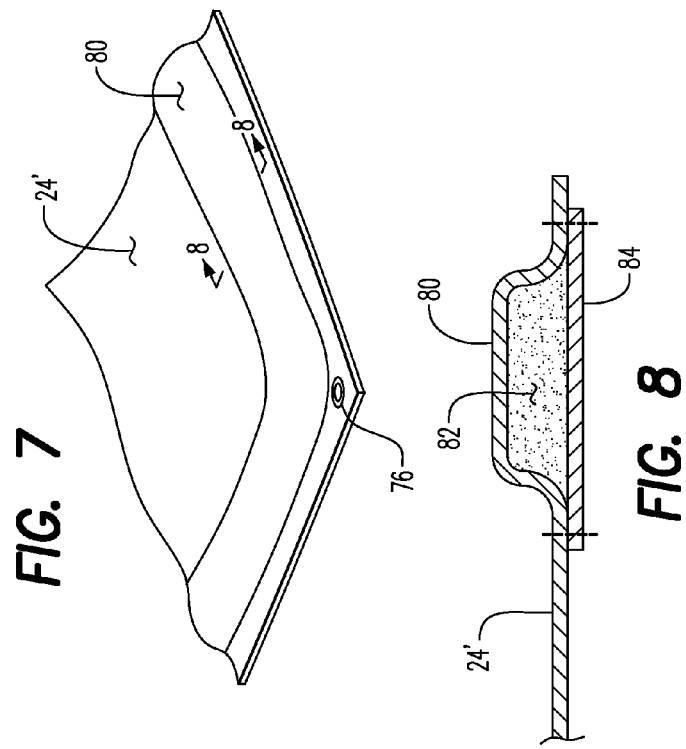
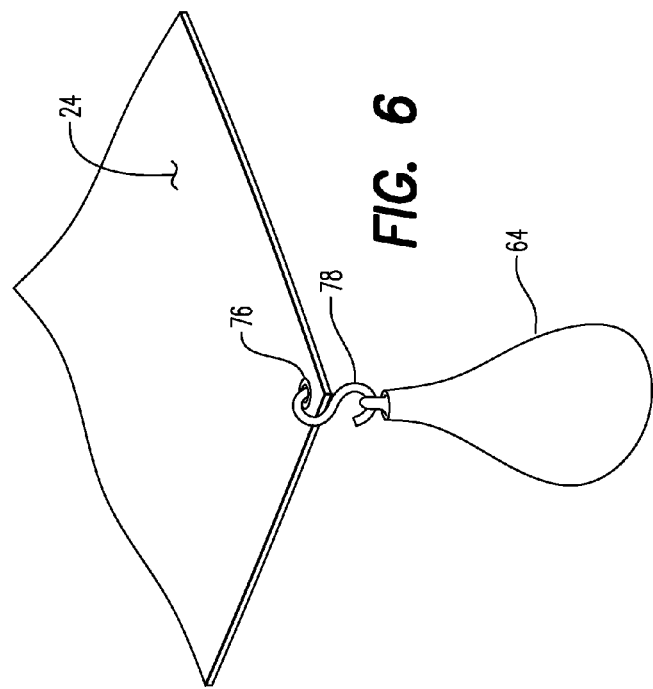

GARAGED VEHICLE COVER

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to devices for protecting a vehicle, and more particularly to an apparatus for automatically protecting a vehicle within the garage by automatically deploying a car cover over the vehicle in draping fashion.

2. Description of Related Art

Despite the fact that vehicles are stored in garages, in most cases, the garage itself is not impermeable to airborne dust and other debris and therefore, vehicles which are stored for prolonged periods of time within a garage will accumulate substantial amounts of dust and debris thereatop. Even for short periods of time, a perfectly clean vehicle placed within a garage for just a matter of a few days will accumulate small amounts of dust and debris thus detracting from the appearance and perfection of a newly polished car.

A number of prior art devices teach various apparatus and structures for covering a vehicle with an enclosure. U.S. Pat. No. 4,830,427 to Fiocchi discloses a vehicle cover support system. Burgess teaches an automobile cover device in U.S. Pat. No. 4,834,128. An automobile cover is taught by Martin in U.S. Pat. No. 1,285,766.

Turner teaches an equipment cover lifting device in U.S. Pat. No. 7,467,784. A boat cover is taught by Kramer in U.S. Pat. No. 7,194,976. U.S. Pat. No. 5,769,105 to Margol et al. discloses a stationary boat cover.

A retractable protective covering is taught by Osborne in U.S. Pat. No. 5,269,332. Moore teaches vehicle ports or vehicle covering systems and apparatus in U.S. Pat. No. 4,487,212.

U.S. Pat. No. 2,679,254 to Green discloses a combination automobile shroud and retractor. Amico teaches a protective cover for vehicles in U.S. Pat. No. 1,849,738. A protective cover for automobiles is also taught by Rush in U.S. Pat. No. 1,801,247.

Pellegrino teaches a suspended cover in U.S. Pat. No. 1,749,628. A cover for vehicles is taught by Sharbondy in U.S. Pat. No. 1,279,596. U.S. Pat. No. 4,991,612 to Kiss et al. teaches a storage mechanism for vehicle covering.

A protective cover for a vehicle is disclosed by Sharapov in U.S. Patent Application Publication 2005/0044886.

The present invention provides an apparatus for automatically covering a vehicle with a generally rectangular unfitted flexible car cover which drapingly lowers during deployment over the vehicle. No additional contouring of the car cover is needed or desired as this structure of the car cover has been found to very adequately protect the vehicle during storage periods. A preferred embodiment of the invention includes a power unit which also serves as a garage door opener so that, as the garage door opens, the car cover is lifted vertically from the vehicle when the garage door is closed after the vehicle is stored, the car cover is automatically deployed downwardly over the vehicle for protected storage. A preferred margin or corner weight for the car cover holds the cover margins against the garage floor to keep dirt and dust from being blown beneath the deployed car cover.

The foregoing examples of the related art and limitations related therewith are intended to be illustrative and not exclusive. Other limitations of the related art will become apparent to those skilled in the art upon a reading of the specification and a study of the drawings.

BRIEF SUMMARY OF THE INVENTION

This invention is directed to a garage car cover apparatus attachable to a ceiling of a garage including a flexible fabric car cover configured to drapingly cover a vehicle. A power unit attaches to the ceiling and to a lifting shaft having a plurality of spaced sheaves. Attaching points on the cover each connect to one end of a flexible line. A plurality of ceiling pulleys are each connectable to the ceiling directly above one of the attaching points when the cover is draped over the vehicle, each flexible line connected at one end to one sheave, a mid-portion of each line supported on one pulley. The cover is raised or lowered vertically from, and drapingly onto the vehicle by operation of the power unit. An alternate embodiment utilizes an existing power unit of an overhead garage door opener to facilitate automatic deployment and retraction.

It is therefore an object of this invention to provide an apparatus which protectively covers a vehicle from dust and debris while it is stored in a garage.

It is another object of this invention to provide an apparatus for protecting a vehicle within a garage which is vertically deployed and removed substantially vertically onto and from the vehicle so as to avoid scratching or marring of the vehicle during deployment and removal of the car cover.

Still another object of this invention is to provide an apparatus for automatically covering and removing a car cover from a vehicle when the power unit of an overhead garage door opener is closed or opened.

Still another object of this invention is to provide an apparatus for protectively covering a vehicle which incorporates uniquely configured overhead conduits attachable to or just beneath or concealed above the garage ceiling for supporting the flexible lines utilized to lift and lower the car cover.

The following embodiments and aspects thereof are described and illustrated in conjunction with systems, tools and methods which are meant to be exemplary and illustrative and not limiting in scope. In various embodiments one or more of the above-described problems have been reduced or eliminated while other embodiments are directed to other improvements. In addition to the exemplary aspects and embodiments described above, further aspects and embodiments will become apparent by reference to the drawings and by study of the following descriptions.

BRIEF DESCRIPTION OF THE SEVERAL VIEWS OF THE DRAWING(S)

FIG. 6 is a perspective view of one corner of the flexible car cover depicting a weight bag attached thereto.

FIG. 7 is a view similar to FIG. 6 depicting an alternate weighted cover edge.

FIG. 8 is a section view in the direction of arrows 8-8 in FIG. 7.

Figure 1:
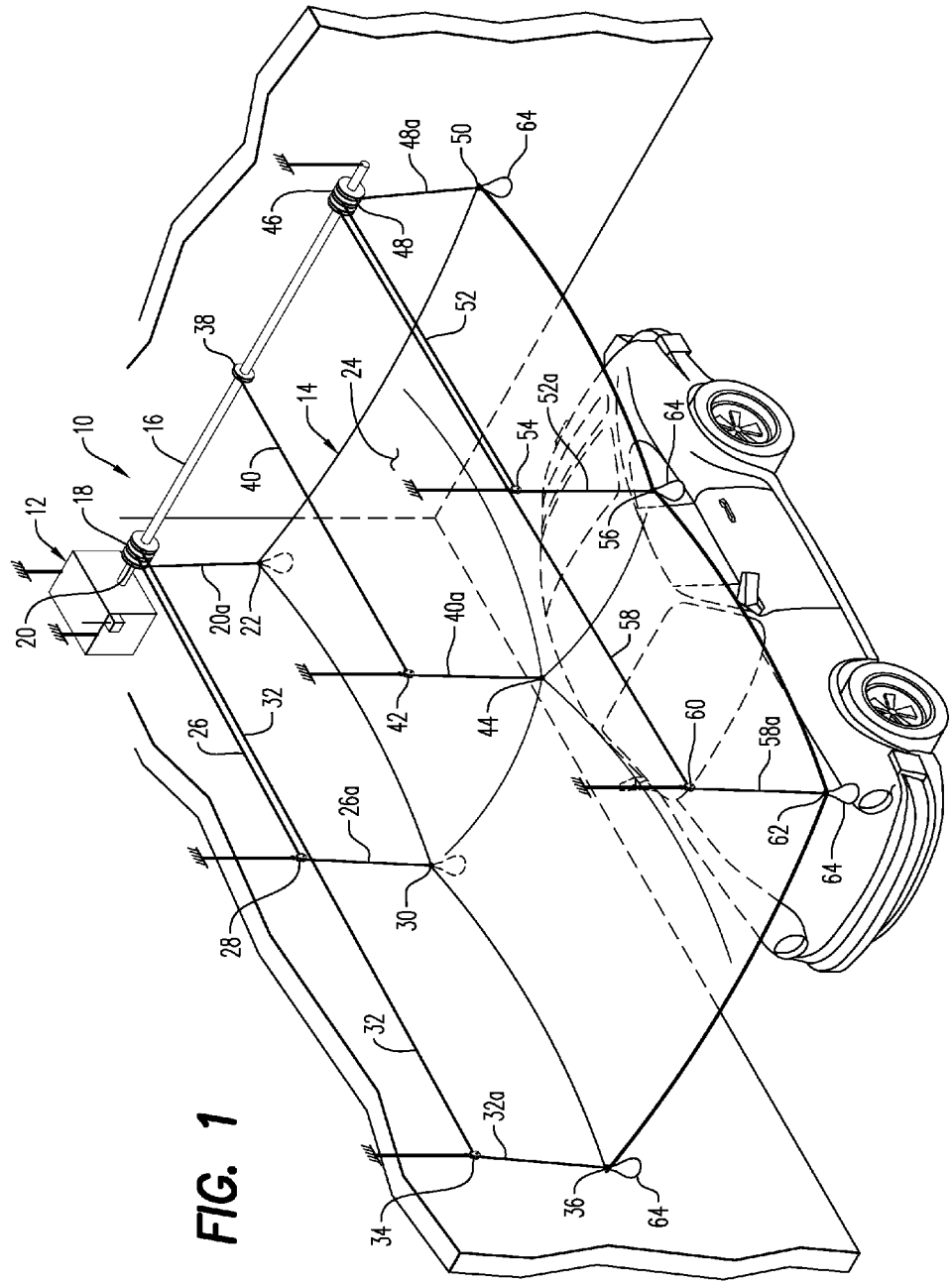
FIG. 1 is a perspective view of the interior of a garage depicting one embodiment of the invention in the raised or stored position above a vehicle.

Exemplary embodiments are illustrated in reference figures of the drawings. It is intended that the embodiments and figures disclosed herein are to be considered to be illustrative rather than limiting.

DETAILED DESCRIPTION OF THE INVENTION

Referring now to the drawings, and firstly to FIGS. 1 to 4, one embodiment of the invention is there shown generally at numeral 10 and includes a power unit 12 attached to the ceiling of a garage. The power unit 12 includes or is connected to an elongated lifting shaft 16 supported at its distal end to the ceiling. Three separate sheaves 38 and sheave groups 18 and 46 are connected to the lifting shaft 16 in spaced apart fashion corresponding to the dimensional width dictates of a flexible fabric car cover 14. The car cover 14 includes a rectangular cover member 24 which is preferably formed of flexible fabric material, but may be formed of any suitable relatively lightweight material for this purpose described below.

The car cover 14 includes attaching points at 22, 30, 36 along one longitudinal edge of the cover member 24, a central attaching point 44 in the center of the cover member 24, and attaching points 50, 56 and 62 along the other longitudinal edge of the cover member 24. As best seen in FIG. 6, preferably attached to each of these lifting points is a weighted bag 64 which may, in simple form, be a sand filled bag attachable to each of the attaching points except for the central attaching point 44 over the vehicle.

The cover member 24 may alternately include attaching points 76 best seen in FIG. 6 in the form of an "S" hook 78. Each "S" hook 78 is connectable to one end (distal end) of one of the flexible lines 26, 32, 42, 52 or 58.

The other end (proximal end) of each of these flexible lines 20, 26, 32, 40, 48, 52 and 58 are connected to one of the corresponding sheaves 18, 38 and 46. Sheave groups 18 and 48 each include three separate sheave members which are closely spaced together and connected rigidly to the lifting shaft 16.

Figure 2:
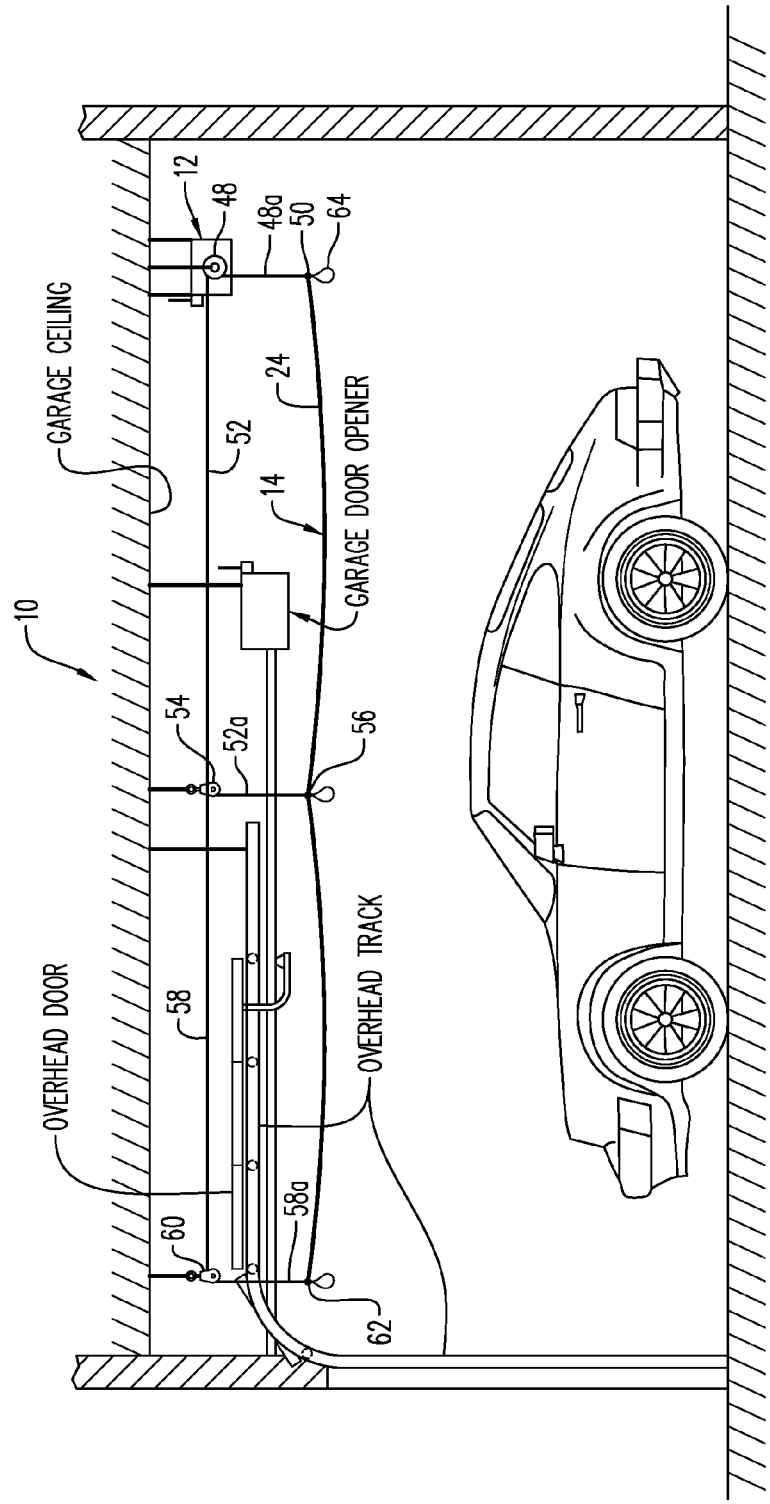
FIG. 2 is a side elevation view of FIG. 1.
Figure 3:
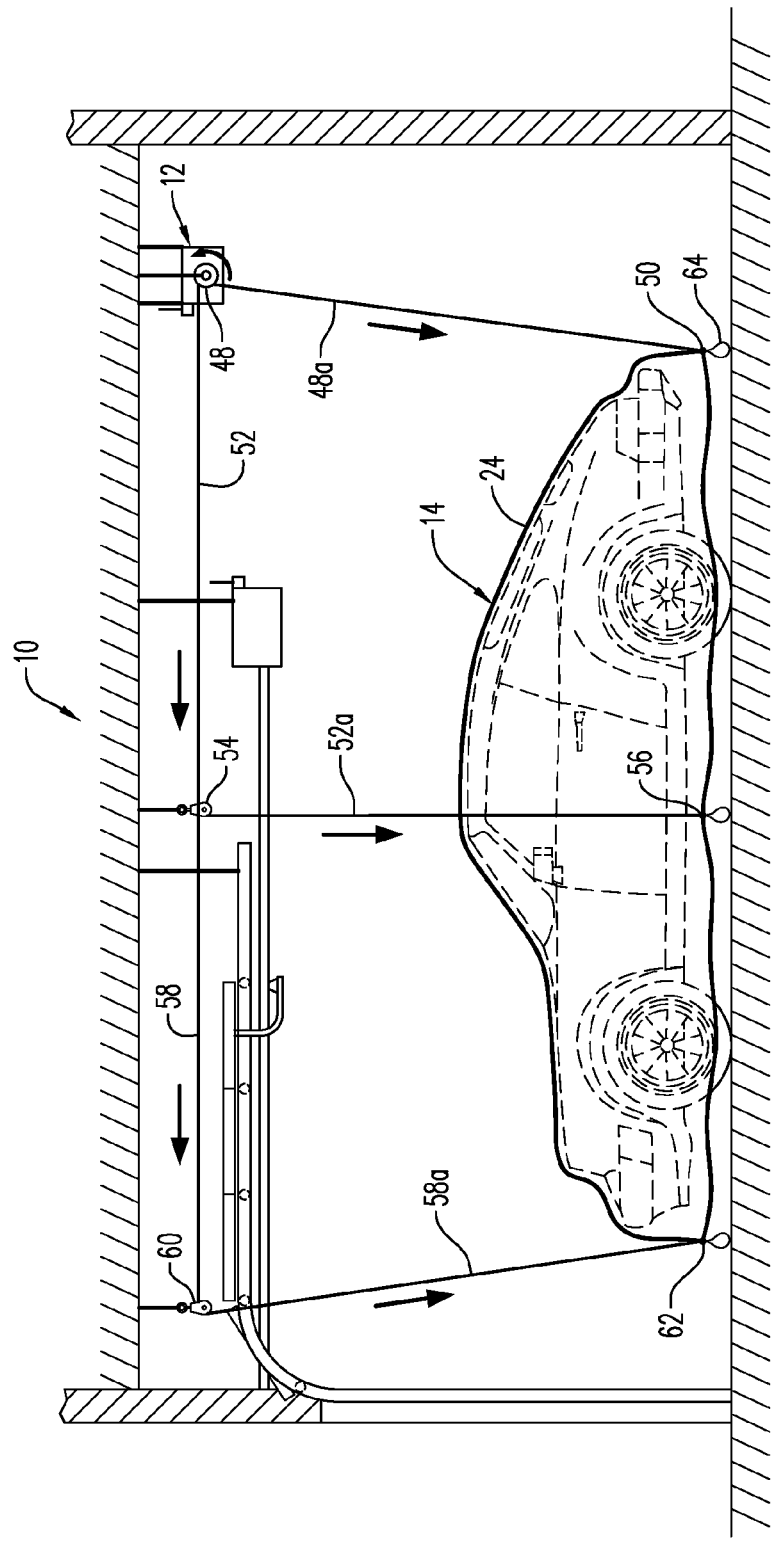
FIG. 3 is a view of FIG. 2 showing the flexible car cover in the deployed position over the vehicle.
Figure 4:
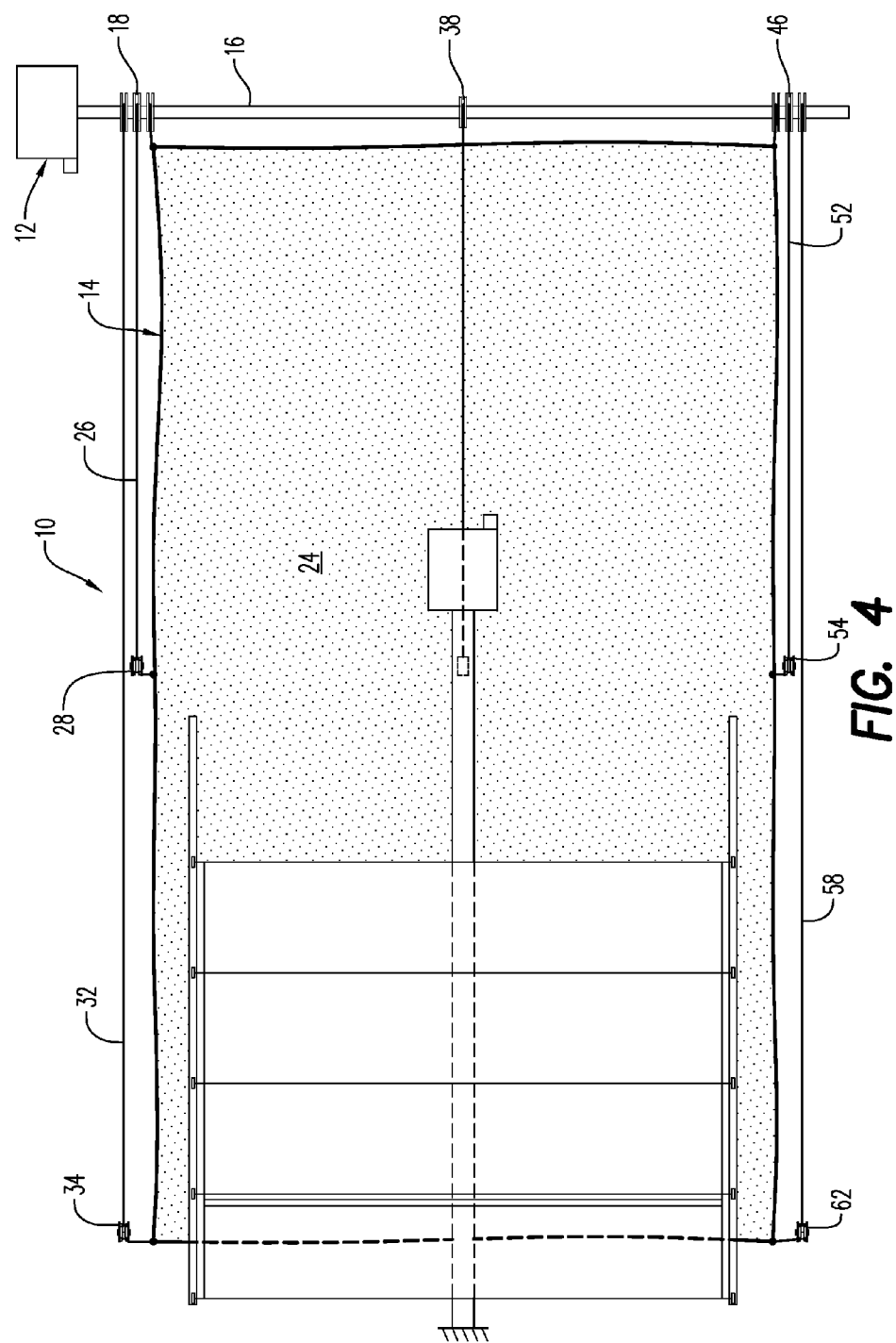
FIG. 4 is a top plan view of FIG. 1 absent the vehicle for clarity.

Attached vertically above each of the attaching points of the car cover 14 when deployed or ready for deployment over the vehicle are ceiling pulleys 28, 30, 42, 54 and 60. Each of these ceiling pulleys supports a mid-portion of a corresponding flexible line 26, 32, 40, 52 or 58. The flexible lines 20 and 48 are supported on one of the sheaves 18 or 46 which are supported on the lifting shaft 16 as shown in FIGS. 1 and 2 for economy. Note that sheave 38, connected to flexible line 40 over ceiling pulley 42 extending downwardly to the attaching point 44 located in the central area of the cover member 24, is smaller in diameter because, as best seen in FIG. 1, the downwardly extending portion 40a of flexible line 40 deploys downwardly a shorter distance equal to about half the distance of the other remaining flexible line portions 20a, 26a, 32a, 48a, 52a and 58a which extend, aided by the weights 64, all the way down to the garage floor. Note also that the deployment and raising of the car cover 14 essentially accomplished in a vertical motion drapingly over the vehicle to avoid the likelihood of scratching or wear as a result of repeated deployment and removal of the car cover 10 onto and from the vehicle.

Figure 5:
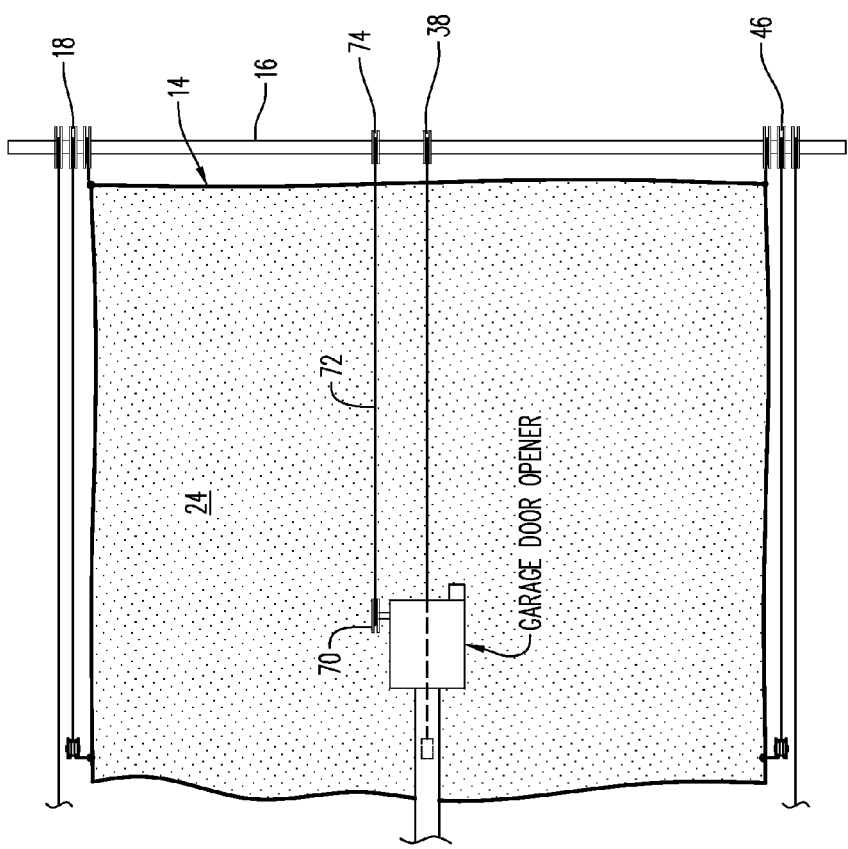
FIG. 5 is a partial view similar to FIG. 4 depicting the preferred utilization of a garage door opener which serves as the power unit of the apparatus.

Referring now to FIG. 5, an alternate and preferred embodiment of the invention utilizes the power unit of a garage door opener in lieu of the separate power unit 12 of apparatus 10. All of the elements of this embodiment of FIG. 5 are otherwise the same as described with respect to FIGS. 1 to 4. The garage door opener includes a rotary output sheave 70 interconnected by a continuous driving belt 72 interengaged with sheave 74 connected on the lifting shaft 16. As a result, this embodiment will automatically deploy the car cover 14 over the vehicle when the garage door opener closes the overhead garage door and will lift the car cover 14 from the vehicle into the stored position shown in FIGS. 1 and 2 when the garage door opener is operated to open the garage door.

Referring now to FIGS. 7 and 8, an alternate form of the weighting of the cover member 24' is there shown wherein a rib 80 of loose sand 82 or other suitable heavy material is covered and stitched in place using a cover strip 84. The advantage of the continuous rib 80 of the weighted material 82 such as sand is that the deployed car cover will be in more uniform contact with the floor of the garage to avoid dust being blown therebeneath to accumulate on the vehicle when stored.

Figure 9:
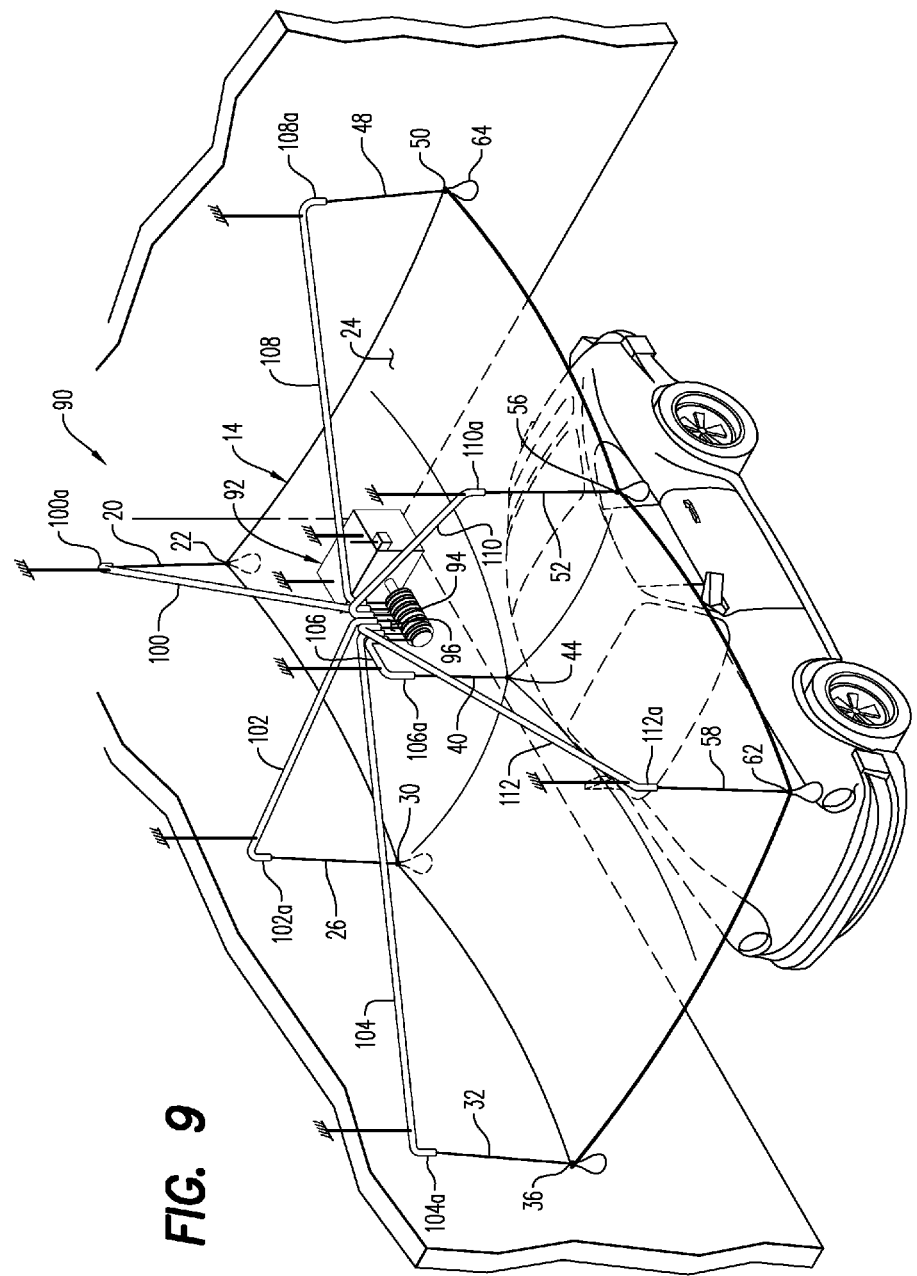
FIG. 9 is a perspective view similar to FIG. 1, except depicting a preferred embodiment of the invention.
Figure 10:
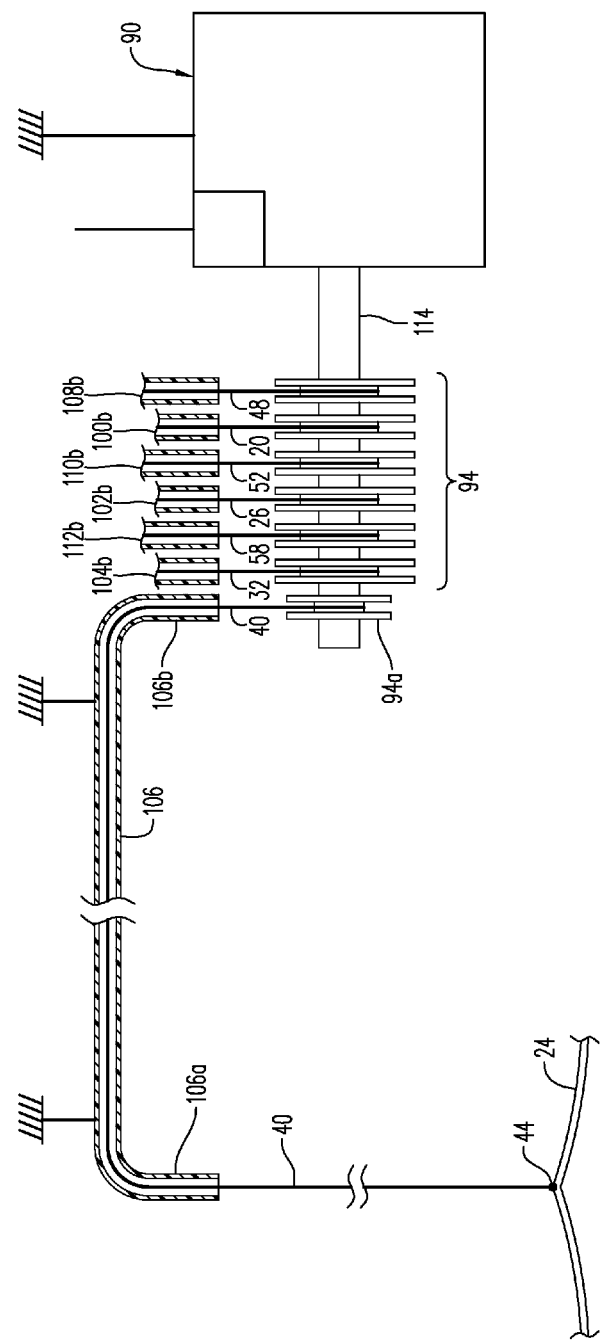
FIG. 10 is a partial longitudinal section view through the power unit 90 and sheaves 94/94a of FIG. 9.

Referring now to FIGS. 9 and 10, an alternate and preferred embodiment of the apparatus is there shown generally at numeral 90. This embodiment 90 includes the car cover 14 as previously described, along with flexible lines 20, 26, 32, 40, 48, 52 and 58, each of which are attached at one end to the corresponding attaching points 22, 30, 36, 44, 50, 56 and 62 as previously described. Weight bags 64 are also included attached to the car cover 14 of this embodiment 90.

However, the power unit 92 includes a plurality of closely spaced sheaves shown generally at numeral 94 (a total of seven sheaves) connected to a rotationally driven lifting shaft 14. Note again that sheave 94a, which is drivingly engaged with flexible line 40 attached at the other end thereof to the central lifting point 44, is smaller in diameter because of the smaller distance of travel downwardly of the lifting point 44 during deployment of the car cover 14.

A total of seven elongated support conduits 100, 102, 104, 106, 108, 110 and 112 replace the ceiling pulleys shown in FIGS. 1 to 4 of embodiment 10. Each of these support conduits is formed of PVC material of a suitable diameter for free running movement of each of the flexible lines which extend over the entire length therethrough. As best seen in FIG. 10, each of these support conduits are connectable to the garage ceiling and have first or distal ends 100a, 102a, 104a, 106a, 108a, 110a and 112a which downwardly extend directly toward one of the corresponding attaching points, 22, 30, 36, 44, 50, 56, and 62, respectively.

Each of the proximal or second end portion of each of the support conduits is downwardly oriented at 100b, 102b, 104b, 106b, 108b, 110b and 112b and directed toward a corresponding one of the sheaves 94 or 94a. By this arrangement, each of the flexible lines 20, 26, 32, 40, 48, 52, and 58 are supported for movement smoothly and freely within the entire length of each of the support conduits which also serve to direct the engagement of the end portions of each of the flexible lines to the corresponding sheave 94 or 94a and to each of the attaching points of the car cover 14. Obviously then, each of the straight mid-portions of each of these support conduits are sized in length to accomplish this purpose.

Figure 11:
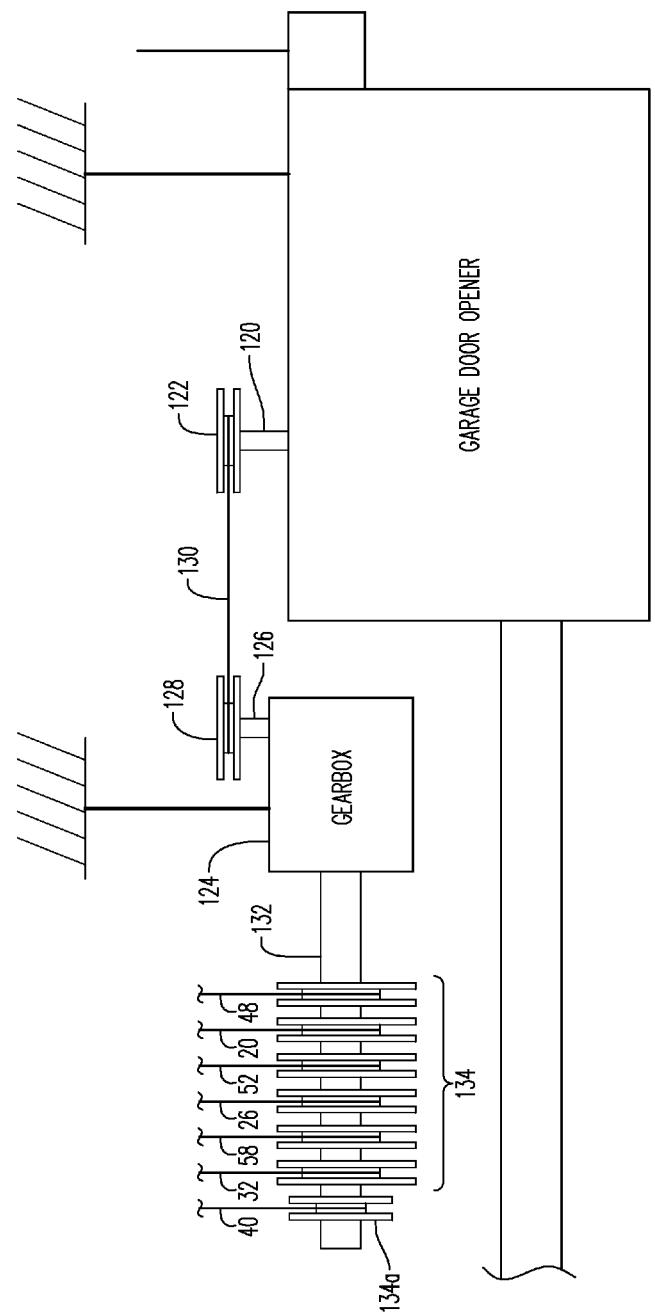
FIG. 11 is a view similar to FIG. 10 depicting an alternate and preferred embodiment which utilizes the garage door opener as a power unit.

Lastly, in FIG. 11, an alternate embodiment to that shown in FIG. 9 utilizes the garage door opener to replace the power unit 92 in FIG. 9. An output shaft 120 driving sheave 122 is interconnected by a continuous belt 130 to sheave 128 of an input shaft 126 of a gearbox, both units of which are supported to the ceiling of the garage. A lifting shaft 132 extending from the gearbox supports the sheaves 134 and 134a as previously described. Again, by this arrangement, the car cover 14 is deployed and raised automatically with the closure and opening of the garage door by the garage door opener.

While a number of exemplary aspects and embodiments have been discussed above, those of skill in the art will recognize certain modifications, permeations and additions and subcombinations thereof. It is therefore intended that the following appended claims and claims hereinafter introduced are interpreted to include all such modifications, permeations, additions and subcombinations that are within their true spirit and scope.

The invention claimed is:

1. A garage car cover apparatus attached or attachable to a ceiling of a garage, said apparatus comprising:
    a power unit attached or attachable to the ceiling;
    a flexible flat fabric car cover shaped and sized to drapingly cover a generally rectangular vehicle;
    a plurality of spaced sheaves operably connectable or connected to said power unit for driven rotation by said power unit;
    a plurality of spaced attaching points, one attaching point of said plurality of attaching points located at each corner, centrally of, and at a midpoint along each lengthwise edge of said car cover;
    a plurality of line support members each connectable to the ceiling directly above a corresponding one of said attaching points;
    a plurality of flexible lines each connected or connectable at one end thereof to one of said sheaves, another end of each of said lines being connected to one of said attaching points, a mid-portion of each of said lines being supported over one of said line support members;
    wherein activation of the power unit rotates said sheaves to automatically raise and lower said car cover vertically from, and drapingly onto the vehicle.

2. A garage car cover apparatus as set forth in claim 1, wherein:
    each of said line support members is an elongated support conduit having a substantially straight mid-portion and first and second end portions orthogonally oriented to said mid-portion, each of said conduits connectable to the ceiling with said first end being directed toward one of the corresponding said attaching points when said cover is deployed over the vehicle, said second end portion of each of said support conduits downwardly oriented and directed toward one of said sheaths.

3. A garage car cover apparatus as set forth in claim 2, wherein:
    said power unit is also operably connected to a garage door wherein activation of said power unit also opens or closes the garage door.

4. A garage car cover apparatus as set forth in claim 3, further comprising:
    a deployment weight connected to each said attaching point at said corners and midpoints of said car cover to hold the margins of said car cover against the floor of the garage when said car cover is deployed over the vehicle.

5. A method of deploying a car cover over a generally rectangular vehicle by operation of a power unit of an overhead garage door opener system connected to a ceiling of a garage, the method comprising:
    providing a flexible flat fabric car cover shaped and sized to drapingly cover a generally rectangular vehicle, the car cover having a plurality of spaced attaching points located at each corner of, centrally of, and at a midpoint along each lengthwise edge of said car cover;
    attaching an elongated rotationally driven lifting shaft with a plurality of spaced apart sheaves connected thereon for driven rotation to the ceiling and to a rotational said output shaft of the power unit;
    attaching a plurality of line support members to the ceiling directly above one of the corresponding said attaching points, one of said line support members for each of said attaching points, when said car cover is covering the vehicle;
    connecting a plurality of flexible lines, each line being connected at one end thereof to one of said sheaves, another end of each of said lines being connected to one of said attaching points, a mid-portion of each of said lines being supported by the corresponding said line support member;
    operating said power unit to open or close the garage door and to automatically rotate said lifting shaft to raise or lower said car cover from or drapingly onto the car, respectively.

6. The method of claim 5, wherein:
    each of said line support members is an elongated support conduit having a substantially straight mid-portion and first and second end portions orthogonally oriented to said mid-portion, each of said conduits connectable to the ceiling with said first end being directed toward one of the corresponding said attaching points when said cover is deployed over the vehicle, said second end portion of each of said support conduits downwardly oriented and directed toward one of said sheaths.

7. A garage car cover apparatus attached or attachable to a ceiling of a garage comprising:
    a flexible flat fabric car cover shaped and sized to drapingly cover a generally rectangular vehicle;
    a power unit attachable or attached to the ceiling and operably connected or connectable to a lifting shaft having a plurality of spaced sheaves connected thereon for rotation with said lifting shaft;
    a plurality of spaced attaching points, one of said plurality of attaching points located at each corner, centrally of, and at a midpoint along each lengthwise edge of said car cover;
    a plurality of elongated support conduits each having a substantially straight mid-portion and first and second end portions which are orthogonally oriented to said mid-portion, each of said support conduits connectable to the ceiling with said first end portion being directed toward one of the corresponding said attaching points when said cover is deployed over the vehicle, said second end portion of each of said support conduits downwardly oriented and directed toward one of said sheaths;
    a plurality of flexible lines each extending through one of said support conduits, one end of each of said lines exiting from said first end portion and being connected or connectable to a corresponding one of said attaching points, another end of each of said lines exiting from said second end portion and being connected or connectable to one of said sheaves;

wherein said power unit selectively rotates said lifting shaft to raise and lower said car cover vertically from, and drapingly onto, the car.

8. A garage car cover apparatus as set forth in claim 7, wherein:

said power unit is also operably connected to a garage door wherein activation of said power unit also opens or closes the garage door.

9. A garage car cover apparatus as set forth in claim 8, further comprising:

a deployment weight connected to each said attaching point at said corners and midpoints of said car cover to hold the margins of said car cover against the floor of the garage when said car cover is deployed over the vehicle.

10. A garage car cover apparatus as set forth in claim 8, wherein:

each margin of said car cover is weighted to hold said car cover against the floor of the garage when said car cover is deployed over the vehicle.

\* \* \* \* \*